Patented Feb. 11, 1947

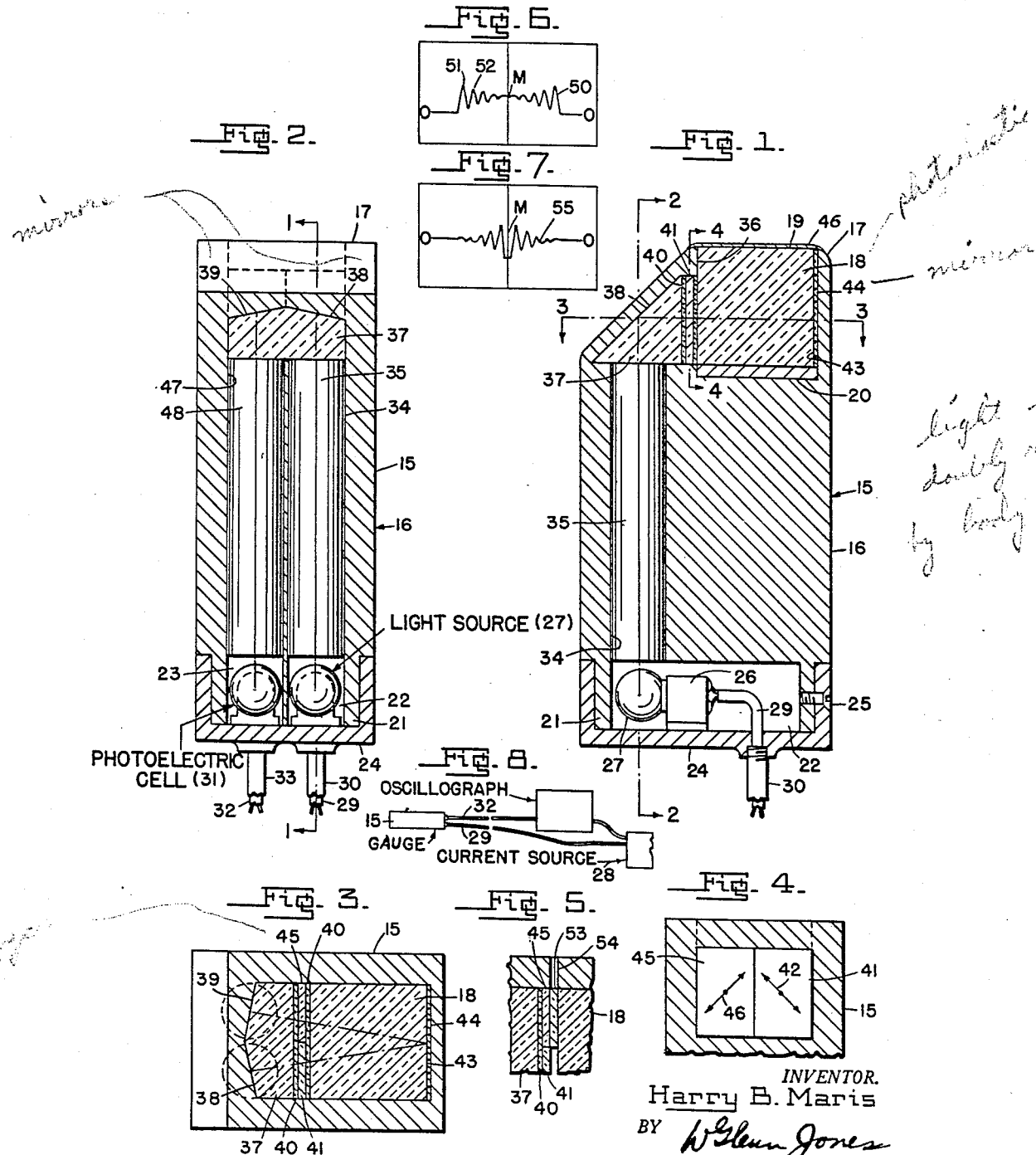
Feb. 11, 1947. H. B. MARIS 2,415,436
PHOTOELASTIC BLAST PRESSURE GAUGE
Filed July 31, 1944
INVENTOR.
Harry B. Maris
BY W Glenn Jones
ATTORNEY.

2,415,436

UNITED STATES PATENT OFFICE 2,415,436

PHOTOELASTIC BLAST PRESSURE GAUGE

Harry B. Maris, Riverdale, Md.

Application July 31, 1944, Serial No. 547,467

8 Claims. (Cl. 88—14)

(Granted under the act of March 3, 1883, as amended April 30, 1928; 370 O. G. 757)

The invention relates to improvements in optical testing instruments and more particularly to a photoelastic blast pressure gauge.

The photoelastic response of transparent materials to stress is substantially instantaneous and very nearly linear. This response involves only the displacements associated with ordinary Young's modulus yielding of the material, that is, there is no spring or bellows action. Displacements are very small and momentum effects are important only when the speed of the action approaches the speed of sound in the photoelastic material. The extremely high speed of response with low momentum makes the photoelastic effect available for blast measurements.

An important object of the invention is to provide a photoelastic blast pressure transducer suitable for use with a cathode-ray oscillograph.

Another object of the invention is the provision of a photoelastic blast pressure transducer having stability and which is not liable to be damaged by explosion shock.

A further object of the invention resides in the provision of a photoelastic blast pressure transducer having a sensitivity variable over a wide range by the use of different photoelastic materials.

Other objects and advantages of the invention will become apparent during the course of the following detailed description, taken in connection with the accompanying drawing, forming a part of this specification, and in which drawing, Figure 1 is a longitudinal sectional view of the photoelastic pressure transducer, substantially on the line 1—1 of Figure 2.

Figure 2 is a longitudinal sectional view of the transducer, substantially on the line 2—2 of Figure 1.

Figure 3 is a transverse sectional view taken along the line 3—3 of Figure 1.

Figure 4 is a fragmentary longitudinal sectional view, taken substantially on the line 4—4 of Figure 1.

Figure 5 is a fragmentary transverse sectional view illustrating a modified form of photoelastic transducer provided with a double refraction compensator.

Figures 6 and 7 are views illustrating the general appearance of records on the oscillograph screen.

Figure 8 is a diagrammatic view of the blast pressure recording apparatus.

In the drawing, which for the purpose of illustration shows preferred and modified forms of the invention, and wherein similar reference characters denote corresponding parts throughout the several views, the numeral 15 generally designates the photoelastic transducer, including an elongate mass 16 constituting a housing. This mass 16 preferably is formed of a dense material, such as hardened lead for stability and freedom from violent shock effects.

Embedded in one end 17 of the mass 16 is a transparent cubiform body 18 having a surface 19 flush with the end 17 and exposed to the blast pressure to be measured. This body 18 may be formed of any suitable material having photoelastic properties which vary with the stress therein. The sensitivity of the transducer 15 will depend on the material used, which may range from gelatin, which will give satisfactory readings for pressures as low as 1 p. s. i., to well mounted glass, which can be used for pressures as great as 10,000 p. s. i. In the example shown, the transparent body 18 is glass, backed by a plastic cushion 20 of lead which is softer than that of the mass 16.

At its opposite end 21, the mass 16 is provided with compartments or chambers 22, 23 having a light-tight cover 24, releasably secured thereover, as by a screw 25. Mounted in the compartment 22, as by a support 26, is a source 27 of light, which may be an auto headlight bulb. This light may be energized by a suitable current source 28 through a cable 29, which may be provided with a shield 30. Similarly mounted in the compartment 23 is a photoelectric cell 31 provided with an output conductor cable 32, preferably including a shield 33. This cell may also be energized by the current source 28.

Extending from the light compartment 22 toward the transparent body 18 is a cylindrical light passageway 34, which may be fitted with a rod 35 of light-conducting material, such as Lucite. Disposed at the end of the light passageway and at one side 36 of the transparent body 18 is a prism 37 having a reflecting surface 38 that is inclined at an angle of 45° to the longitudinal axis of the passageway 34 as shown in Figure 1, and that is tilted laterally as shown in Figure 3. This prism 37 is also provided with another reflecting surface 39 which is likewise inclined at a 45° angle and tilted laterally in dihedral angular relation to the surface 38, as shown in Figure 3. Secured between the prism 37 and the body 18, as by transparent cement 40, is a polarizer 41, for 45° plane polarizing the light entering the side 36 of the transparent body from the prism 37, as indicated by the normal 42 in Figure 4. At its opposite side 43, the transparent body 18 is provided with a mirror surface 44 for reflecting light from the prism reflector 38 to the prism reflector 39. Secured between the body 18 and the prism 37 is an analyzer 45, for plane polarizing the light entering the prism from the transparent body, but crossed with respect to the polarizer 41, as shown by normal 46 in Figure 4. Extending from the prism 37 to the photoelectric cell compartment 23 is a cylindrical light passageway 47, parallel to the passageway 34 and fitted with a light conducting rod 48.

In the operation of the photoelastic transducer 15, light from the source 27 after traversing the passageway 34 enters the prism 37 and falls on the reflecting surface 38. This surface reflects the light at an angle of 90° and enough toward the center so that the maximum reflection from the mirror 44 will fall on the reflector 39. Before reaching the photoelastic body 18, the beam passes through the polarizer which is set to plane polarize the light at an angle of 45° with the longitudinal axis of the mass 16. Beyond the polarizer, the light passes into the photoelastic body 18 where it is doubly refracted by an amount proportional to the stress in the material. Reflection from the mirror 44 on the back of the photoelastic body 18 doubles the path through the gauge. After leaving the photoelastic body, the light passes through the analyzing polarizer 45, and is then directed by the reflector 39 along the passageway 47 to the photoelectric cell 31. The cell is shielded from the flash of explosion gases by the light-tight cover 24 and the face 19 is shielded, as by a tough flexible coat 46 of black paint. As shown in Figure 8, current from the photoelectric cell is taken by the cable 32 from the compartment 23 to a cathode ray oscillograph for recording. The impulses are of course spread over the oscillograph screen by any suitable sweep circuit with variable timing corresponding to the timing of the blast to be measured.

A glass body one inch thick will give roughly eight orders of double refraction, one order being equal to one-half wavelength of path difference between the two beams. The record on the oscillograph screen, if a source 27 of white light is used, will have the general appearance of an interrupted damped sine wave with a variable time scale, the interruption of the damping indicating the double refraction for maximum stress on the gauge. A damped wave 50 with a fixed time scale which approximates the record given by double refraction from a standard light bulb is shown in Figure 6. The blast pressure is represented as starting with zero pressure and zero double refraction at the left, increasing to the point M, which represents maximum pressure and maximum double refraction, and then decreasing to zero pressure and zero double refraction on the right. While the timing of an actual blast will be different from that shown in Figure 6, the relation of amplitudes in build up and decay will be the same. The difference in double refraction between one peak 51 and the next peak 52 represents one order of double refraction and a constant pressure change which can be evaluated by static loading of the photoelastic body, pressure changes between peaks being proportional to the phase angle of the sine curve. White light could not be satisfactory for measuring pressures producing more than 5 orders of double refraction. The character of the record can of course be changed by varying the character of the light and its initial polarization in accordance with principles well known to those versed in the photoelastic art.

If a suitable correctly oriented double refraction compensator of crystal quartz is inserted in the light path between the polarizer 41 or analyzer 45 and the photoelastic body 18, zero double refraction can be obtained with any desired stress in the photoelastic body 18. Figure 5 shows a quartz compensator 53 disposed, as by insertion through a suitable slot 54 in the housing, between the photoelastic body 18 and the analyzer 45. The type of record obtainable by using white light with a compensator 53 is shown at 55 in Figure 7. The record is represented as starting with zero pressure and maximum double refraction at the left of Figure 7, changing to maximum pressure and zero double refraction at M and progressing to zero pressure and maximum double refraction at the right. If the approximate amplitude M of the desired reading is known, a compensating plate which will place that part M of the pressure scale in a sensitive part of the double refraction range, for example, near the zero point, as shown in Figure 7, will make accurate readings possible. Thus a quartz compensator with white light can be used for accurate measurements of almost any amount of double refraction.

Various changes may be made in the forms of invention herein shown and described without departing from the spirit of the invention or the scope of the following claims.

The invention described herein may be manufactured and used by or for the Government of the United States of America for governmental purposes without the payment of any royalties thereon or therefor.

I claim:

1. A blast pressure gauge comprising a mass of high density, a transparent body mounted in said mass and having a surface exposed to said blast pressure, a thin flexible opaque covering for shielding said exposed surface from light, said body having photoelastic properties varying with the stress therein, means producing and passing plane polarized light into said transparent body in a direction substantially parallel to said exposed surface, means analyzing the light emerging from said body, a photo-electric cell receiving the light from said analyzer means, and a cathode-ray oscillograph controlled by said photoelectric cell for recording the several orders of double refraction that may be produced in said body by the component of said blast pressure normal to said exposed surface.

2. A blast pressure gauge as defined in claim 1, wherein means are provided for reflecting the light passing through said transparent body back in a direction substantially parallel to said exposed surface along another path through said body to said analyzing means.

3. A blast pressure gauge as defined in claim 1, wherein a double refraction compensator formed of a material with fixed doubly refracting properties is provided in the path of said light adjacent to the transparent body to cancel the double refraction of the transparent body with a predetermined condition of stress therein.

4. A blast pressure gauge as defined in claim 1, wherein said body is formed of glass, said mass is formed of hardened lead, and a plastic cushion of soft lead is disposed between said body and said mass.

5. A blast pressure gauge comprising an elongate mass of high density, a transparent body mounted in one end portion of said mass and having a surface exposed to said blast pressure, said body having photoelastic properties varying with the stress therein, two compartments at the opposite end portion of said mass a source of light in one of said compartments, a photo-electric cell in the other of said compartments, a first light duct with reflecting walls in said mass extending between said light source and said body, said first duct directing light from said source into said body in a direction parallel to said exposed surface, a second light duct with reflecting walls in said mass extending between said body and said photo-electric cell, said second duct receiving light from said body and directing said light to said photoelectric cell, said first duct containing a polarizer and said second duct containing an analyzer, and a cathode-ray oscillograph controlled by said photoelectric cell for recording the several orders of double refraction that may be produced in said body by said blast pressure.

6. A blast pressure gauge as defined in claim 5, wherein said transparent body is provided with a mirror for reflecting light passing into said body from the first duct back through said body into the second duct.

7. A blast pressure gauge as defined in claim 5, wherein a double refraction compensator is provided between the transparent body and one of said ducts to cancel the double refraction of the transparent body for a predetermined condition of stress therein.

8. A blast pressure gauge as defined in claim 5, wherein the reflecting walls of said first and second light ducts include dihedrally disposed reflecting surfaces intersecting in an edge inclined at an angle of approximately 45° to the longitudinal axis of said mass, and said transparent body is provided with a mirror, one of said reflecting surfaces directing light from said first light duct through said body onto said mirror, said mirror reflecting said light back through said body onto the other of said reflecting surfaces, said last-mentioned surface reflecting said light along said second light duct.

HARRY B. MARIS.

REFERENCES CITED

The following references are of record in the file of this patent:

UNITED STATES PATENTS

| Number | Name | Date |
| --- | --- | --- |
| 2,014,688 | Mabboux | Sept. 17, 1935 |

FOREIGN PATENTS

| Number | Country | Date |
| --- | --- | --- |
| 728,632 | French | Apr. 12, 1932 |